March 27, 1934.    R. G. MacIVER    1,953,001

ANTIFRICTION BEARING

Filed Feb. 25, 1931    3 Sheets-Sheet 1

March 27, 1934.  R. G. MacIVER  1,953,001
ANTIFRICTION BEARING
Filed Feb. 25, 1931  3 Sheets-Sheet 2
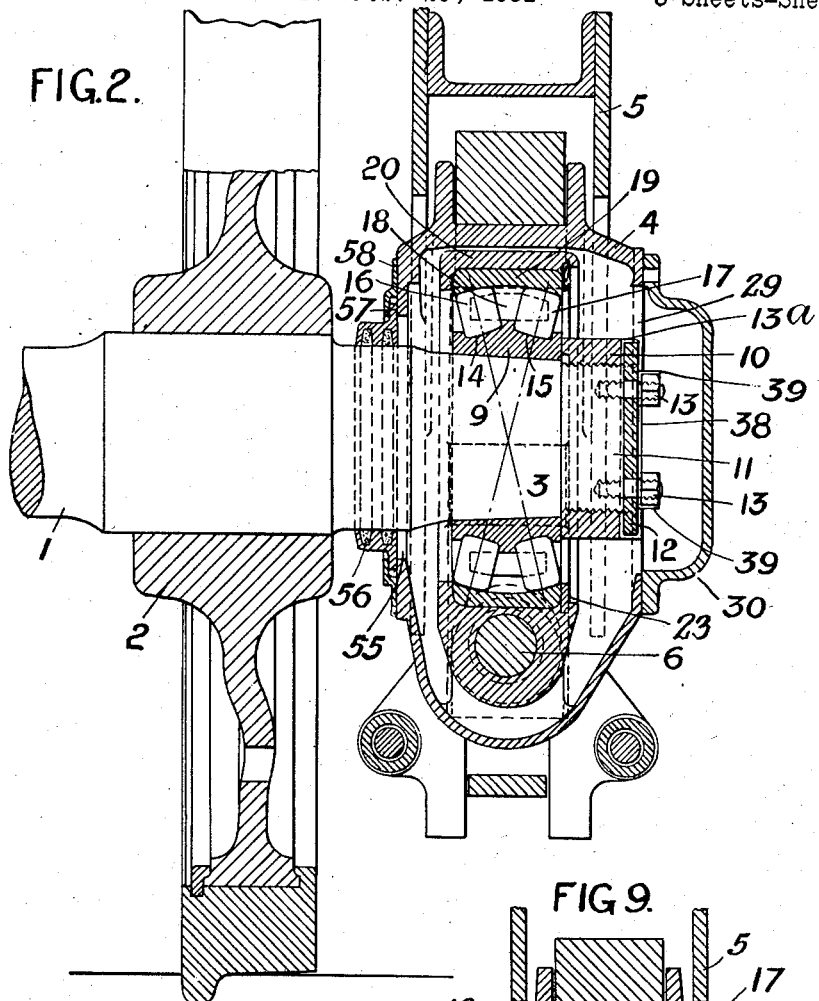
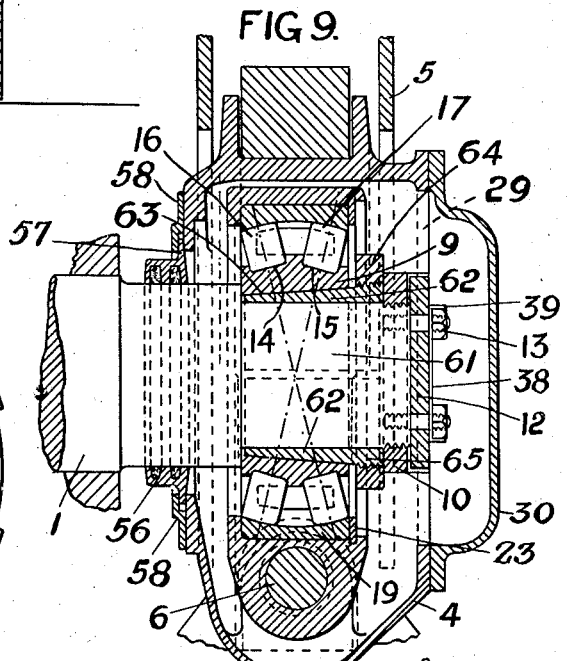
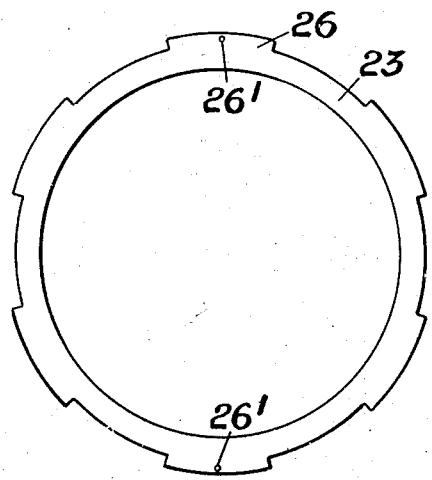
Inventor
Robert G. MacIver
By Henry Orth Jr. atty.

March 27, 1934.　　　R. G. MacIVER　　　1,953,001

ANTIFRICTION BEARING

Filed Feb. 25, 1931　　　3 Sheets-Sheet 3

Inventor
Robert G. MacIver
By Henry Orth
Atty.

Patented Mar. 27, 1934

1,953,001

UNITED STATES PATENT OFFICE 1,953,001

ANTIFRICTION BEARING

Robert Graves MacIver, London, England, assignor to J. Stone & Company Limited, Deptford, England., a company of Great Britain Application February 25, 1931, Serial No. 518,199
In Great Britain April 9, 1930

6 Claims. (Cl. 308—180)

This invention relates to improvements in anti-friction spherical roller or ball bearings for railway and other vehicles and has for its main object to provide a bearing which is simple in construction and in assembly and is accessible for ready removal or replacement.

In one known type of bearings of this kind the outer race has an inner spherical face while the inner race has the usual grooving for the rollers or balls. The inner race is secured on the axle journal and the outer race is embraced by a housing from which the axle box is so supported that lateral and angular movements of the axle produce swinging movements of the outer race about the bearing and the load on the bearing is equalized. At the same time such movements are resisted by raising of the load. It is a further object of the invention to improve the effectiveness and durability of such bearings.

The bearing may be of the type known as an S. K. F. double row self-aligning roller bearing wherein the inner race has formed in it a pair of annular channels in each of which an annular row of rollers is located, the rollers in said rows being inclined away from each other and the grooves in the inner race being also appropriately inclined. The peripheries of the rollers are of spherical form to correspond with the spherical form of the inner face of the outer race.

Figure 1:
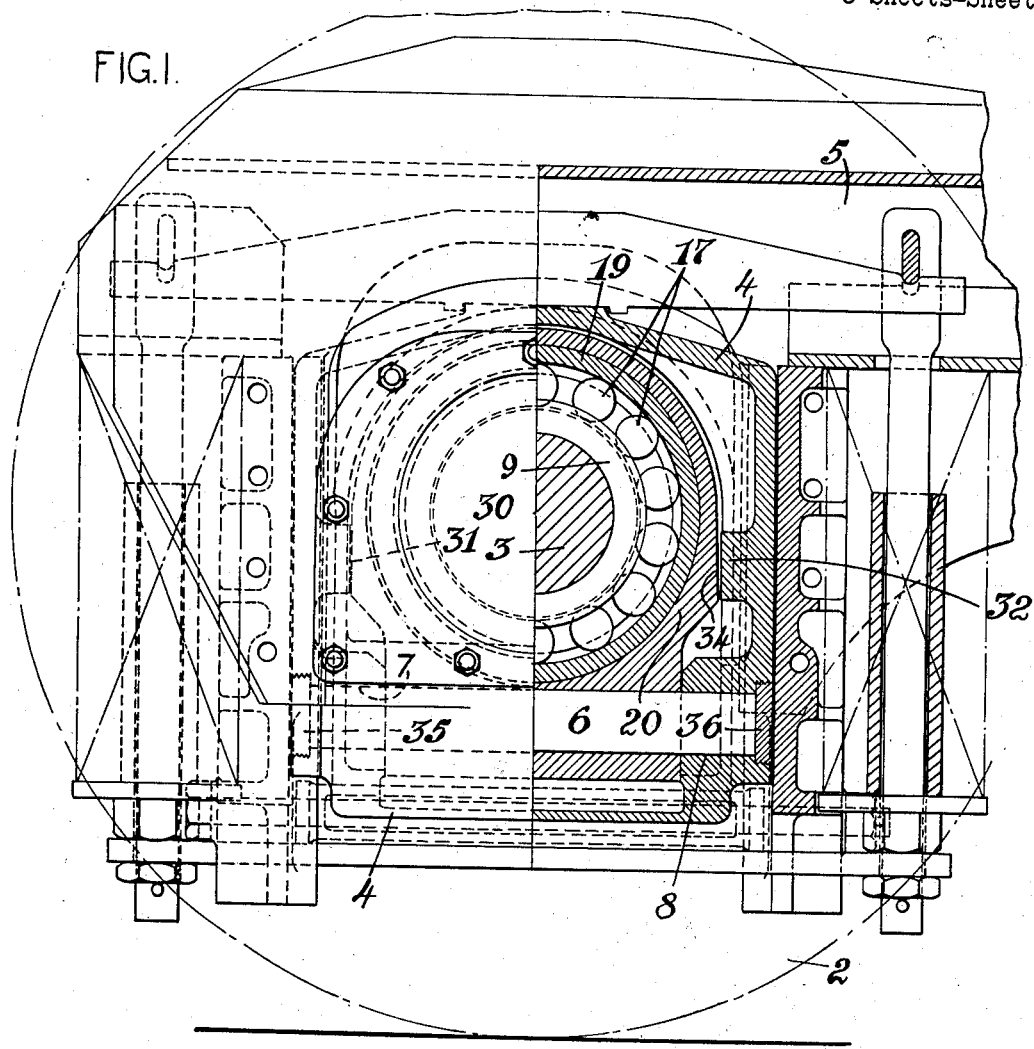
Figure 6:
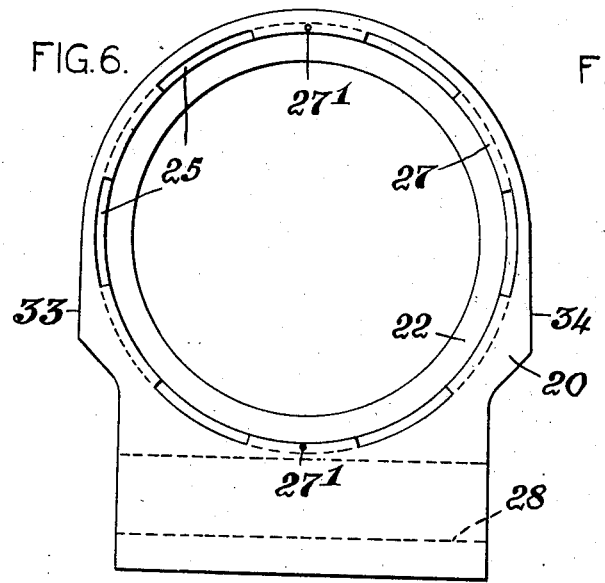
Figure 7:
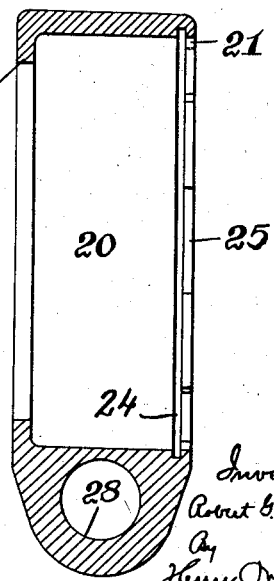
Figure 3:
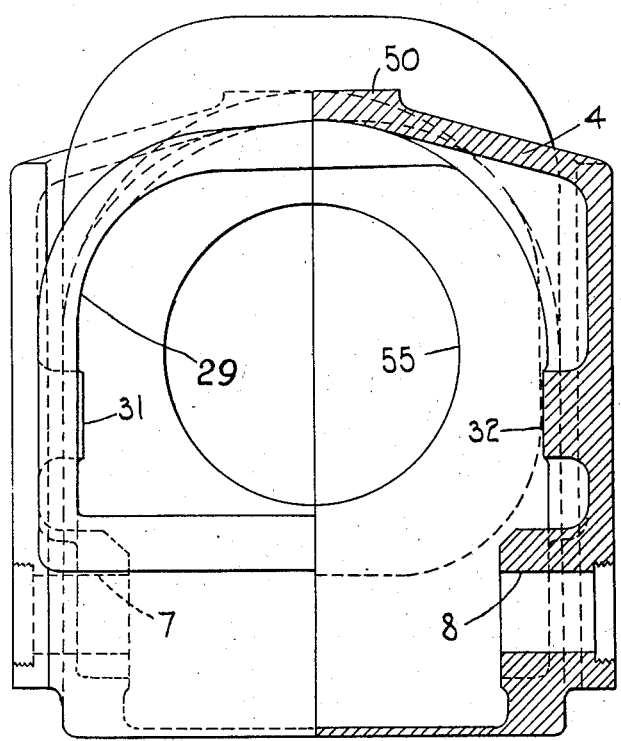
Figure 5:
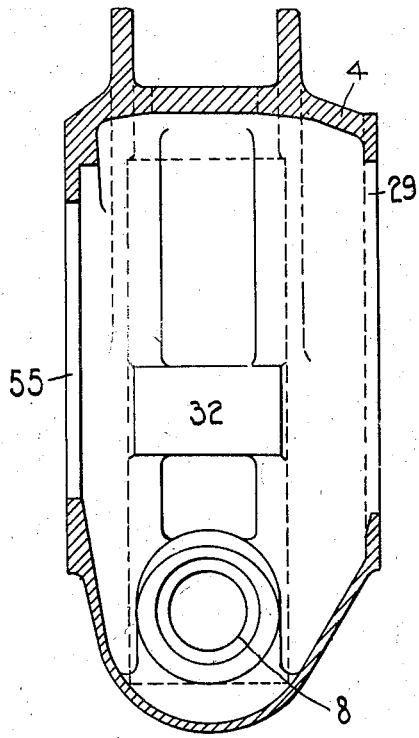
Figure 10:
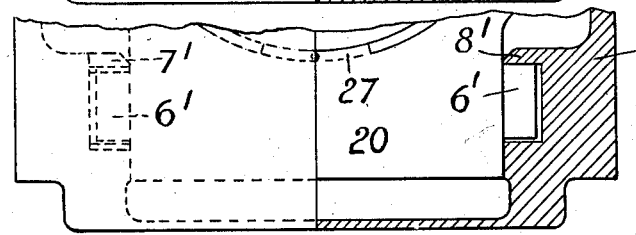
Figure 4:
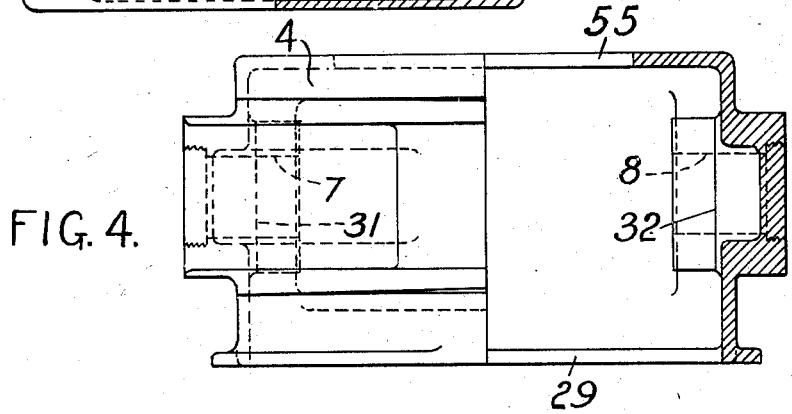

The accompanying drawings illustrate examples of bearings according to the invention:

Figs. 1 and 2 are a side elevation partly in section and a vertical section showing an axle box and roller bearing for rolling stock, Figs. 3, 4 and 5 are a partly sectional side elevation and plan and a central vertical section of the axle box, Figs. 6 and 7 are a side elevation and vertical section of the pivotal housing for the roller bearing, Fig. 8 is a view of a retaining ring for the housing, Fig. 9 is a vertical section of a modified form of roller bearing and Fig. 10 is a part sectional elevation showing a modified detail.

Referring to Figs. 1 to 8, 1 designates an axle of a wagon, coach or other rolling stock, the journal 3 projecting beyond the flanged wheel 2 being carried in an axle box 4 supporting the vehicle main frame 5. The axle bearing is mounted so as to rock laterally within the axle box 4 about a longitudinal pivot pin 6 located below the bearing and in the central plane thereof. The pivot pin 6 is carried in bearings 7 and 8 formed in bosses in the axle box 4, which is conveniently a unitary casting. The journal 3 is of tapered formation and an inner race 9 of, for example, hardened steel is fitted on such journal so as to rotate solidly therewith, being secured in position by a locking ring 10 screwed on a stub 11 forming an extension of the axle journal 3.

The locking ring 10 is held in position by an end plate 12 secured to the stub 11 by studs and nuts 13. Said locking ring 10 is formed at its outer side with notches 13a engaged by peripheral projections on the end plate 12. The nuts 13 may be locked by means of a locking device such as a washer 38 with right angle projections 39 engaging faces of the nuts 13.

The inner race 9 is provided with annular grooves 14, 15 forming tracks for sets of rollers 16, 17 which have part-spherical bearing surfaces and are set angularly in a cage 18. The outer race 19 is provided with a part-spherical inner surface of corresponding curvature to the rollers. The grooves 14 and 15 and the cage 18 co-operate to give the desired offset to the axes of the rollers of the respective races to render the bearing self-aligning. The outer race 19 is fitted snugly in a cast, drum-shaped housing 20 (Figs. 6 and 7) open at its front face 21 to permit passage of the race 19 and provided at the rear with a flange 22 forming a stop for such race. 23 is a retaining ring (Fig. 8) for securing the race 19 in the housing 20, an annular groove 24 (Figs. 6 and 7) being formed adjacent the front face of said housing 20 for the reception of the retaining ring, and segmental slots 25 being located at equidistant intervals around the front face 21 of said housing and communicating with said annular groove 24. The retaining ring 23 is provided on its periphery with corresponding segmental projections 26 dimensioned to pass through the slots 25. The ring 23 may then be turned so that the projections 26 lie behind the remaining portions 27 of the face 21, the ring 23 being then in abutment with the outer race 19 and retaining it in position against the rear flange 22. The retaining ring 23 may be secured by small bolts engaging aligned threaded holes 26', 27' in the segmental projections 26 and 27 respectively.

The axle box 4 has a frontal aperture 29 closed by a dished cover 30 (Figs. 1, 2 and 9) which is removed to obtain access to the bearing. The aperture 29 is sufficiently large to permit of the housing 20, carrying the bearing, being inserted or removed from its position in the axle box. The interior of the axle box 4 is provided with locating lugs 31 and 32 which abut with correspondingly flattened portions 33 and 34 on the housing 20. Further the depending portion of the housing 20 (Fig. 1), in which a bore 28 is provided for the pivot pin 6, fits flush between the bearings 7 and 8 which thereby function as thrust members. The outer ends of the bearings 7 and 8 are of larger diameter and are screw threaded to receive plugs 35, 36 which maintain the pin 6 in position.

The pivot pin 6 is inserted from outside the axle box 4, after the housing 20 has been inserted in the latter with the bore 28 in alignment with the bearings 7, 8 in the bosses. When the inserted bearing comprising the housing 20 and the outer and inner races and rollers has been assembled in the axle box 4, the latter together with the bearing can be moved into position on the axle journal, the inner race with its tapered face being forced upon the tapered axle journal.

To maintain a dustproof closure at the rear aperture 55 in the axle box while permitting of limited free angular and longitudinal movement of the axle 1, as when taking bends, a seal 56 mounted on the journal 3 is provided with a peripheral flange 57 which projects into a recess between an annular cover plate 58 and the axle box 4.

Referring now to Fig. 9 wherein the axle 1 has a parallel journal 61, the inner race 9 is mounted on a split sleeve 62, the conical exterior surface 63 of which coincides with the inner surface of the race 9. A lock nut 10 retains the sleeve 62 in place, while a ring 64 screwed on a portion 65 of the sleeve 62 facilitates detachment of said sleeve; screwing the ring 64 against the race 9, after the nut 10 has been removed, readily frees the sleeve 62. To allow of removal of the bearing without disturbing the axle box, the aperture 29 is made sufficiently large, both as to height and width, to pass the roller bearing complete.

Instead of mounting the housing 20 of the antifriction bearing on a pin 6 as described, the downward extension on the housing 20 may be solid and have its opposite ends formed with trunnions 6' (Fig. 10) adapted to have their bearing in U-shaped recesses 7', 8' formed in projections on opposite sides of the inside of the axle box 4.

A considerable advantage accruing from the antifriction bearing for vehicle axles constructed according to the present invention lies in the fact that one such bearing for each journal is adequate for the heaviest load likely to be experienced.

What I claim is:

1. In an anti-friction bearing arrangement for a vehicle axle, a spherical rolling bearing comprising an outer race swingable in relation to the axle, an integral bearing housing embracing and swingable with said outer race, pivotal means suspended from said housing below the axle, and an axle box wholly enclosing said housing and pivotal means, and provided with complete journal bearings engaging said pivotal means, whereby said axle box is supported by the latter.

2. In an anti-friction bearing arrangement for a vehicle axle, a double row rolling bearing of the spherical type comprising an outer race swingable upon the bearing in relation to the axle, a bearing housing in one piece embracing and swingable with said outer race, pivotal means suspended from said housing below the axle, and an axle box wholly enclosing said housing and pivotal means and provided with complete journal bearings engaging said pivotal means, whereby said axle box is supported by the latter.

3. An anti-friction bearing arrangement according to claim 2, wherein the axle box is formed with internal bosses providing the journal bearings for the pivotal means, whereby said axle box is supported by the latter.

4. In an anti-friction bearing arrangement for a vehicle axle, a spherical rolling bearing comprising an outer race swingable in relation to the axle, an integral bearing housing swingable with said outer race and open at one side to permit of lateral insertion and removal of the bearing bodily in and from said housing, readily removable fastening means at said open side of the housing for securing the bearing therein, pivotal means suspended from said housing, and an axle box wholly enclosing said housing and pivotal means and having journal bearings for said pivotal means which thereby support the said axle box.

5. In an anti-friction bearing arrangement according to claim 4, wherein the fastening means comprise a retaining ring, a slotted rim of the housing at the open side thereof, and bayonet-like connection means on the ring and housing for securing the former in said slot.

6. In an anti-friction bearing arrangement for a vehicle axle, a spherical rolling bearing comprising an outer race swingable in relation to the axle, an integral bearing housing swingable with said outer race and open at one side to permit of lateral insertion and removal of the bearing bodily in and from said housing, readily removable fastening means at said open side of the housing for securing the bearing therein, pivotal means suspended from said housing, and an axle box having journal bearings for said pivotal means, said axle box having on the outside a wide aperture so that the bearing can be moved bodily as aforesaid through such aperture.

ROBERT GRAVES MacIVER.